US012625625B2

(12) United States Patent　　(10) Patent No.:　US 12,625,625 B2
Zlotnik et al.　　(45) Date of Patent:　May 12, 2026

(54) REDUCED POWER ADDRESSING

(71) Applicant: Micron Technology, Inc., Boise, ID (US)

(72) Inventors: Leon Zlotnik, Camino, CA (US); Leonid Minz, Bear Sheva (IL)

(73) Assignee: Micron Technology, Inc., Boise, ID (US)

( * ) Notice: Subject to any disclaimer, the term of this patent is extended or adjusted under 35 U.S.C. 154(b) by 27 days.

(21) Appl. No.: 18/768,914

(22) Filed: Jul. 10, 2024

(65) Prior Publication Data

US 2025/0117143 A1　　Apr. 10, 2025

Related U.S. Application Data

(60) Provisional application No. 63/588,524, filed on Oct. 6, 2023.

(51) Int. Cl.
G06F 3/06　　(2006.01)

(52) U.S. Cl.
CPC .......... G06F 3/0625 (2013.01); G06F 3/0659 (2013.01); G06F 3/0673 (2013.01)

(58) Field of Classification Search
CPC ..... G06F 3/0625; G06F 3/0659; G06F 3/0673
See application file for complete search history.

(56) References Cited

U.S. PATENT DOCUMENTS

| | | | |
|---|---|---|---|
| 3,430,070 A | 2/1969 | Marshall, Jr. et al. | |
| 5,179,295 A | 1/1993 | Mattison et al. | |
| 5,226,009 A | 7/1993 | Arimoto | |
| 5,392,302 A * | 2/1995 | Kemp | G06F 11/1016 |
| | | | 714/E11.043 |
| 5,548,557 A * | 8/1996 | Futatsuya | G11C 16/08 |
| | | | 365/201 |
| 5,767,717 A | 6/1998 | Schorn et al. | |
| 6,308,249 B1 | 10/2001 | Okazawa | |
| 9,599,672 B2 | 3/2017 | Abhishek et al. | |
| 11,048,583 B1 * | 6/2021 | Hokenmaier | G06F 11/1048 |
| 11,152,054 B2 | 10/2021 | Sun et al. | |
| 11,705,173 B1 * | 7/2023 | Zlotnik | G06F 12/0284 |
| | | | 714/719 |
| 2006/0294282 A1 | 12/2006 | Warner | |
| 2011/0296134 A1 | 12/2011 | Ping et al. | |
| 2012/0185752 A1 * | 7/2012 | Maheshwari | G06F 11/1076 |
| | | | 714/768 |
| 2015/0055405 A1 | 2/2015 | Shiratake | |
| 2019/0310780 A1 * | 10/2019 | Gholamipour | G06F 3/0679 |

OTHER PUBLICATIONS

A defintiion of gray code, also known as reflective binary code (Year: 2012).*

* cited by examiner

*Primary Examiner* — Janice M. Girouard
(74) *Attorney, Agent, or Firm* — Brooks, Cameron & Huebsch, PLLC

(57)　　　ABSTRACT

An intermediate component can be provided between initiator components (from which access requests are originated) and target components (that are to be accessed via the access requests). The intermediate component can encode, decode, and/or bypass the encoding process of address bits to ensure that address bits of the access requests are in a format that is compatible with access of the respective target component.

22 Claims, 4 Drawing Sheets

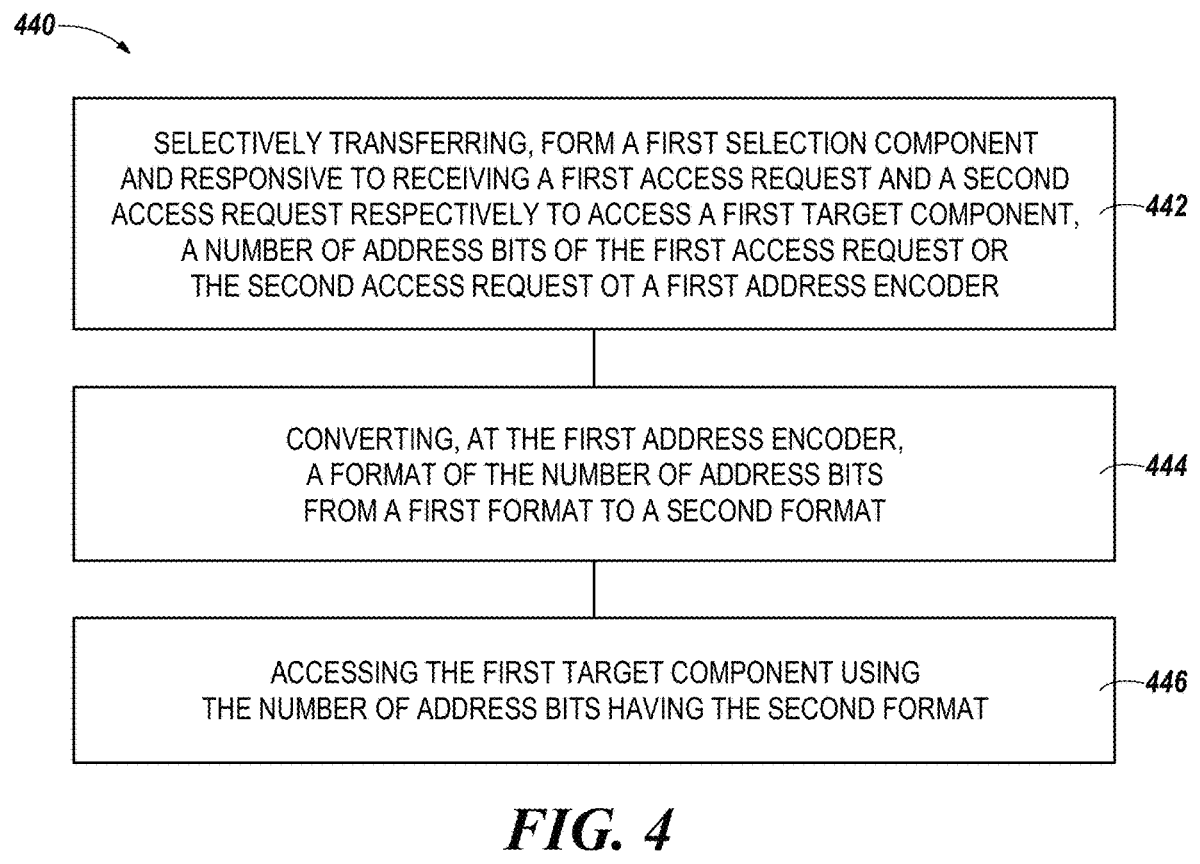

440 —

SELECTIVELY TRANSFERRING, FORM A FIRST SELECTION COMPONENT
AND RESPONSIVE TO RECEIVING A FIRST ACCESS REQUEST AND A SECOND
ACCESS REQUEST RESPECTIVELY TO ACCESS A FIRST TARGET COMPONENT,
A NUMBER OF ADDRESS BITS OF THE FIRST ACCESS REQUEST OR
THE SECOND ACCESS REQUEST OT A FIRST ADDRESS ENCODER
— 442

CONVERTING, AT THE FIRST ADDRESS ENCODER,
A FORMAT OF THE NUMBER OF ADDRESS BITS
FROM A FIRST FORMAT TO A SECOND FORMAT
— 444

ACCESSING THE FIRST TARGET COMPONENT USING
THE NUMBER OF ADDRESS BITS HAVING THE SECOND FORMAT
— 446

*FIG. 4*

REDUCED POWER ADDRESSING

PRIORITY INFORMATION

This application claims the benefits of U.S. Provisional Application No. 63/588,524, filed on Oct. 6, 2023, the contents of which are incorporated herein by reference.

TECHNICAL FIELD

Embodiments of the disclosure relate generally to reduced power addressing.

BACKGROUND

Various types of electronic devices such as digital logic circuits and memory systems may store and process data. A digital logic circuit is an electronic circuit that processes digital signals or binary information, which can take on two possible values (usually represented as 0 and 1). The digital logic circuit can use logic gates to manipulate and transform the digital signals or binary information. Digital logic circuits can be used in a wide range of electronic devices including, for example, computers, calculators, digital clocks, and many other electronic devices that employ digital processing. Digital logic circuits can be designed to perform specific logical operations on digital inputs to generate digital outputs, and, in some instances, can be combined to form more complex circuits to perform more complex operations.

BRIEF DESCRIPTION OF THE DRAWINGS

The present disclosure will be understood more fully from the detailed description given below and from the accompanying drawings of various embodiments of the disclosure.

FIG. 4 is a flow diagram corresponding to a method for performing reduced power addressing in accordance with various embodiments of the present disclosure.

DETAILED DESCRIPTION

Figure 1:
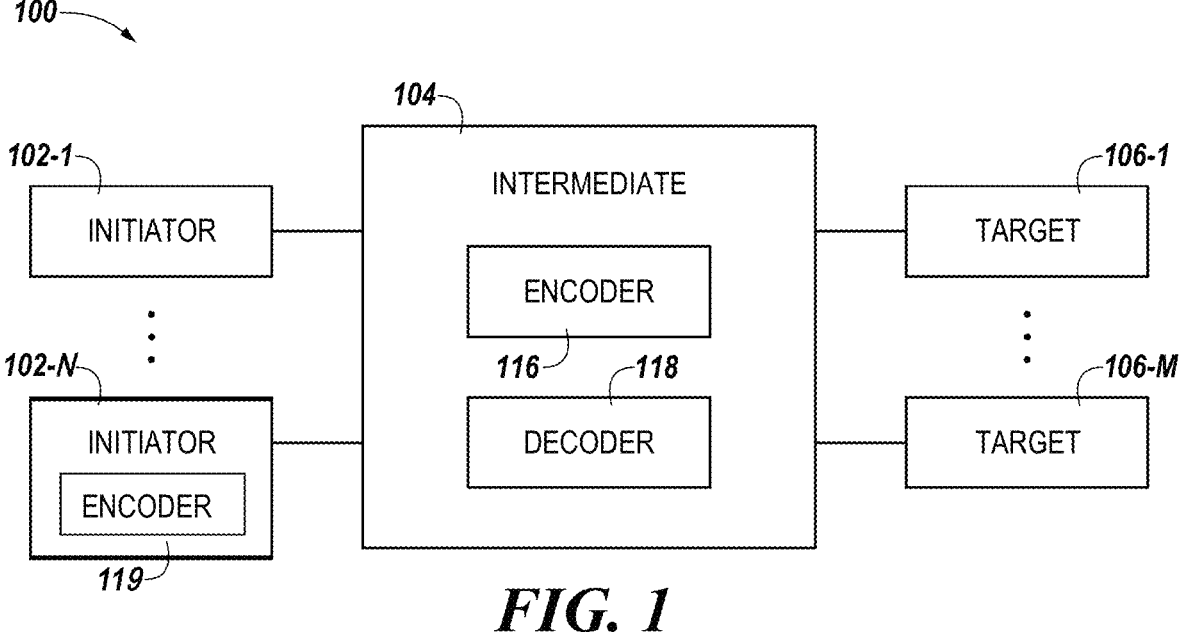
FIG. 1 illustrates an example portion of a computing system configured to perform reduced power addressing in accordance with some embodiments of the present disclosure.

Aspects of the present disclosure are directed to reduced power addressing within electronic systems. Various components within an electronic system, such as a System-on-Chip (SoC), can be accessed via respective address buses. Such components can include memory devices (e.g., arrays), interface connectors having ports, buses etc. that have addresses that can be accessed via access requests originated from different entities (e.g., host processors). In some examples, these addresses having successive addresses (e.g., consecutive physical addresses) can be or need to be sequentially accessed as opposed to those addresses that are not necessarily sequentially accessed despite having successive addresses. The latter access scheme is known as "random access", in which addresses can be independently accessed without the need to traverse through all the addresses sequentially from one end to the other end (e.g., from the beginning to the end or vice versa).

In A sequential access scheme, an address signal can be toggled to switch from one set of address bits (to access one portion of the memory) to the other set of address bits (to access a subsequent portion of the memory). In this approach, a quantity of toggles occurred in accessing the memory can often be based on a number of particular data values to be switched (e.g., "0" to "1" or "1" to "0") between two sets of address bits, and each toggle can incur a power consumption. Therefore, the increased quantity of toggles can undesirably increase the power consumed in accessing the memory cells and it is desired to reduce the power consumption associated with sequentially accessing any addresses within the computing system.

As described in more detail herein, aspects of the present disclosure provide an intermediate component coupled between initiator components (that generate and issue access requests and simply referred to as "initiators") and target components (that are to be accessed via the access requests and simply referred to as "targets") with capability of encoding address bits to have a reduced Hamming distance code format. The intermediate component can be "interconnects" (e.g., Network-on-Chip (NOC), fabric interconnect, ring interconnect, bus interconnect, etc.), one or more buses, or transmission lines, or any combination thereof, that connects multiple/different entities (such as parts/components/modules, etc.) and serves as data paths between the entities. As used herein, the term "reduced Hamming distance binary code" refers to binary code having a reduced Hamming distance between two consecutive values. Although embodiments are not so limited, the reduced Hamming distance binary code can be reflected binary code (RBC) code (alternative referred to as "Gray code"), Johnson ring (cyclic) code, etc., as compared to a binary code that is not tailored to reduce a Hamming distance (alternatively referred to as "non-reduced Hamming distance binary code" or simply referred to as "binary code format"). In some embodiments, the reduced Hamming distance binary code can be unit-distance binary code, such as RBC code, in which two successive binary values differ in a single bit position.

A reduced Hamming distance code format is designed in a manner that, when switching from one set of address bits to another to sequentially access two addresses, only a small number of bits change, often just one. This deliberate reduction in bit changes during the transition helps significantly reduce power consumption, up to a 50% decrease compared to methods that do not use this specific encoding. In essence, this means that the power consumed in changing addresses is reduced because the switch from one set of address bits to another involves toggling only a controlled number of bits, typically just a single bit.

Furthermore, the intermediate component not only encodes sets of address bits to be in a reduced Hamming distance binary code format, but also provides bypass and/or decoding mechanism in the event that a target component (e.g., having addresses to be accessed using the sets of address bits) is not compatible with access via address bits having a reduced Hamming distance binary code format. For example, if accessing addresses of the target component with address bits having a reduced Hamming distance binary code format is not possible and/or feasible, the intermediate component can either not encode the address bits (such that the address bits with a binary code format are transferred to the target component as is) or decode the encoded address bits to convert a format of the encoded address bits back to a binary code format.

The intermediate component can be utilized to transfer address bits (either with a reduced Hamming distance binary code format or a different binary code format) to anywhere within computing systems that have addresses and desired to be accessed in accordance with the number of embodiments of the present disclosure. Although embodiments are not so limited, those addresses that can be accessed using the address bits can include addresses of interconnect, fabric (e.g., system-on-chip fabric), crossbar, network on a chip, intellectual property (IP) cores (e.g., one or more blocks of data and/or logic that form constituent components of an application-specific integrated circuit or field-programmable gate array), partitions, (e.g., digital or analog) domains, components, modules, structures, etc. that can be sequentially addressed (as opposed to being randomly addressed). As a result of this intermediate component being capable of providing various functionalities described above, embodiments of the present disclosure can provide benefits, such as reduced power consumption associated with toggling address bits, reduced/eliminated cross talk in address buses (e.g., signals being carried by one or more address buses interfering each other), reduced electromagnetic (EM) noise due to simultaneous switching between chipsets, tiles, etc.

FIG. 1 illustrates an example computing system 100 that includes initiator components 102-1, . . . , 102-N (collectively referred to as initiator components 102), an intermediate component 104 with an address encoder/decoder 116/ 118, target components 106-1, . . . , 106-M (collectively referred to as target components 106) in accordance with some embodiments of the present disclosure.

The computing system 100 can be a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), system-on-chip (SoC), chipsets (e.g., a collection of integrated circuits), tiles, Field-Programmable Gate Arrays (FPGA) structures (e.g., segmented FPGA structures), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 includes initiator components 102-1, . . . , 102-N. The initiator components 102 (alternatively referred to as initiators) are entities from which an access request originates. For example, the initiator components 102 can generate and issue an access request to access (e.g., to write data to or read data from) a particular target component 106 (e.g., one of target components 106-1, . . . , 106-M). Although embodiments are not so limited, the initiator components 102 can be processing resources including various processing units, such as a central processor unit (CPU), direct memory access (DMA) processor, digital signal processor (DSP), etc.

The computing system 100 includes target components 106-1, . . . , 106-M. The target components 106 are entities to which an access request (e.g., generated at the initiator component 102) is routed. Access requests (when executed at and/or in association with the target component 106) are directed to addresses of the target components 106. As an example, the target component 106 can be an entity with addresses to be accessed via the access requests (e.g., from the initiators 102).

In some embodiments, the target component 106 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

In some embodiments, the target component 106 can be a physical host interface (e.g., interface connector) that has addresses to be accessed via the access requests. For example, ports (e.g., initiator port of another interface, loopback port of the same fabric, input/output (I/O) ports, etc.) of the target components 106 can have addresses that can be accessed via access requests originating from initiator components 102. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other physical host interface that transfers data according to various communication protocols, such as an NVM Express (NVMe) interface, universal asynchronous receiver/transmitter (UART) protocols, or any other protocols.

The computing system 100 includes an intermediate component 104, through which access requests generated at the initiator components 102 can be routed. The intermediate component 104 can include hardware circuitry to perform the operations described herein, such as converting one or more address bits having one format to another, selectively route and/or process access requests, etc. For example, the intermediate component 104 can include special purpose circuitry in the form of an ASIC, FPGA, state machine, and/or other logic circuitry.

The intermediate component 104 can be coupled between the initiator components 102 and target components 106. As used herein, "coupled to", "coupled with", or "coupled between" generally refers to a connection between components, which can be an indirect communicative connection or direct communicative connection (e.g., without intervening components), whether wired or wireless, including connections such as electrical, optical, magnetic, and the like. Although the intermediate component 104 is illustrated in FIG. 1 as being distinctive from initiator and target components 102 and 106, the intermediate component 104 can be part of one or more initiator components 102-1, . . . , 102-N or one or more target components 106, or any combination thereof.

The intermediate component 104 can correspond to a fabric that serves as a data pathway for access requests originating from the initiator components 102 to ensure that access requests can reach target components 106 (variously located within the computing system 100). The intermediate component 104 can further include an address encoder 116 (shown as "encoder" in FIG. 1) and/or an address decoder 118 (shown as "decoder" in FIG. 1) that can respectively encode or decode address bits of access requests and to ensure that access requests can be executed in the desired formats (e.g., reduced Hamming distance code format or binary code format, or any combination thereof) at those target components 106. As used herein, the term "encoding" refers to converting a format of address bits to a reduced Hamming distance binary code format (e.g., from a binary code format), while the term "decoding" refers to converting a format of address bits to a binary code format (e.g., from a reduced Hamming distance binary code format). A reduced Hamming distance code format is designed in a manner that, when switching from one set of address bits to another to sequentially access two addresses, only a small number of bits change, often just one. Accordingly, the encoded sets of address bits, when toggled to be switched from one set of address bits to another set of address bits, reduces a quantity of toggles, which can significantly reduce power consumption compared to methods that do not use this specific encoding. In essence, this means that the power consumed in changing addresses is reduced because the switch from one set of address bits to another involves toggling only a controlled number of bits, typically just a single bit.

In some embodiments, at least a portion of initiator components 102 can also include an address encoder that provides substantially the same functionality as the address encoder 116. For example, as illustrated in FIG. 1, the initiator component 102-N includes an address encoder 119 that can performing "encoding" process on at least a portion of address bits of access requests; thereby, eliminating a need for those access requests originated from the initiator component 102-N to be encoded at the intermediate component 104.

In some embodiments, at least one of initiator components 102, target components 106, and/or intermediate component 104 can be capable of leveraging benefits and costs of accessing target components using address bits having a reduced Hamming distance binary code format. For example, prior to encoding access requests, it can be determined how many "toggles" would be needed to access target components 106 with address bits having a reduced Hamming distance binary code format as well as with address bits having a binary code format (e.g., non-reduced Hamming distance binary code format). In this example, if an amount of toggles that could be reduced by accessing target components 106 with the address bits having a reduced Hamming distance binary code format (as compared to address bits having a non-reduced Hamming distance binary code format) is not over a threshold amount (indicating that the cost of encoding process may outweigh the benefit of the reduced toggles), initiator components 102, target components 106, and/or intermediate component 104 may not encode the access requests and access addresses of target components 106 with address bits having a non-reduced Hamming distance binary code format. On the other hand, if the amount of reduced toggles is not less than (e.g., exceeds) the threshold amount, initiator components 102, target components 106, and/or intermediate component 104 can encode the access requests to access target components 106 with address bits having a reduced Hamming distance binary code format.

Figure 2:
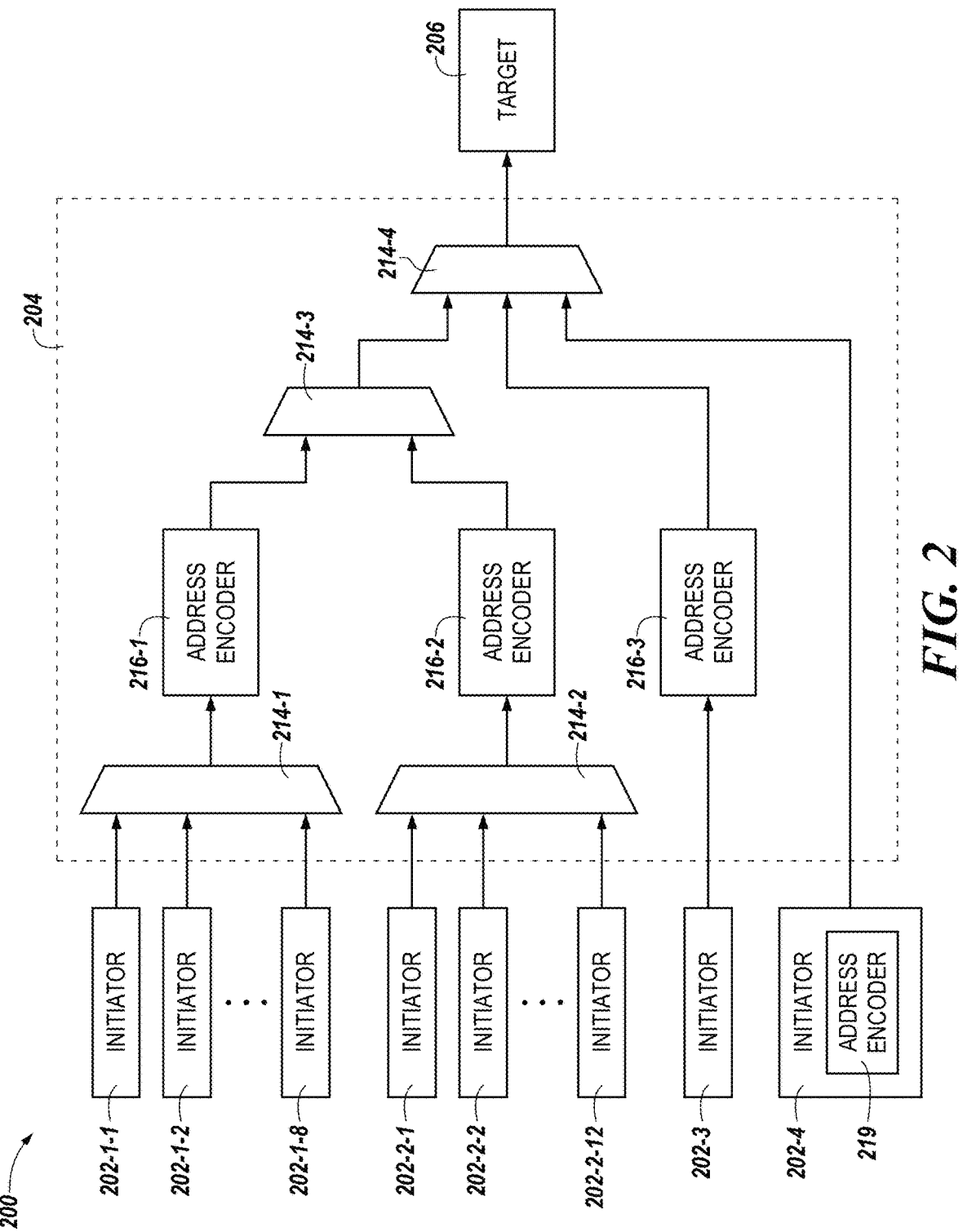
FIG. 2 illustrates an example portion of a computing system configured to perform reduced power addressing in accordance with various embodiments of the present disclosure.

FIG. 2 illustrates an example computing system 200 illustrating further details of the intermediate component 204 in accordance with some embodiments of the present disclosure. As illustrated in FIG. 2, the computing system 200 includes initiator components 202-1-1, . . . , 202-1-8, 202-2-1, . . . , 202-2-12, 202-3, and 202-4 ("initiator" shown in FIG. 2), selection components 214-1, . . . , 214-4, address encoders 216-1, . . . , 216-3, and a target component 206. However, embodiments are not so limited to a particular quantity of each component and/or circuits (e.g., selection components, address encoders, address decoders, etc.) of the intermediate component 204 the computing system can include. Initiators 202, intermediate component 204, and target component 206 are analogous to initiators 102, intermediate component 104, and target component 106 illustrated in FIG. 1.

As illustrated in FIG. 2, initiators 202-1-1, . . . , 202-1-8 are coupled to the selection component 214-1 that is further coupled to the address encoder 216-1, while initiators 202-2-1, . . . , 202-2-12 are coupled to the selection component 214-2 that is further coupled to the address encoder 216-2. As used herein, the term "selection component" refers to a component that selects one of its inputs (access requests originating from the initiators 202) and outputs the selected input (e.g., to transfer to a subsequent circuit, circuitry, component, etc.). The selection component 214 can be implemented as hardware and/or firmware and can incorporate various mechanisms, including but not limited to priority management, quality of service control, security measures, rule-based arbitration, access control, and other means for regulating the selection process as described herein.

In some embodiments, each selection component of the selection components 214 can have a corresponding buffer that provides commands and/or data to a corresponding selection component. For example, the selection components 214 can access requests from the corresponding buffers and can provide the accessed requests to the subsequent circuit (e.g., address encoder 216, different selection components 214, etc.), component (e.g., target component 206), etc. Further, the selection components 214 can operate according to one or more policies on what inputs (e.g., access requests) to output first prior to the other access requests. As non-limiting examples, the selection component 214 can be a selector, multiplexer, arbiter, or any combination thereof. Although not illustrated in FIG. 2, the intermediate circuitry 204 can further include control circuitry that can control selection components 214 (in the event that these selection components 214 lack capability to independently operate) to select which input to select and output.

As illustrated in FIG. 2, access requests respectively generated at (e.g., at least some of) the initiators 202-1-1, . . . , 202-1-8 are transferred to the selection component 214-1, which selectively transfers (e.g., outputs) the access requests (e.g., one or few at a time) to the address encoder 216-1. Further, access requests respectively generated at the initiators 202-2-1, . . . , 202-2-12 are transferred to the selection component 214-2, which selectively transfers the access requests (e.g., one at a time) to the address encoder 216-2. The initiator 202-3 is directly coupled to the address encoder 216-3 without being coupled to a separate selection component.

The initiator 202-4 includes an address encoder 219 that provides substantially the same functionality (e.g., converting a format of at least a portion of address bits of access requests to a reduced Hamming distance code format) as the address encoder 216. Therefore, the initiator 202-4 is directly coupled to the selection component 214-4 without being coupled to a separate address encoder of the intermediate component 204.

As described herein, sets of address requests can be respectively encoded at the address encoders 216-1, 216-2, 216-3 such that a format of each set of address bit can be converted from one (e.g., binary code format) to another (e.g., reduced Hamming distance code format). Sets of address bits originating from respective initiator components 202 can be encoded early in the process, for example, using an address encoder located near the initiator components 202. This allows address bits to be transferred as encoded to various target components (as encoded) that are located at various stages of the computing system 100.

In an example scenario, sets of address bits that are to be used for sequentially accessing 8 different address of the target component 206 can each have at least three bits in a reduced Hamming distance code format (e.g., an RBC format) or a natural binary code format as follows:

TABLE 1

|  | RBC | Natural Binary Code |
|---|---|---|
| 1st access | 000 | 000 |
| 2nd access | 001 | 001 |
| 3rd access | 011 | 010 |
| 4th access | 010 | 011 |
| 5th access | 110 | 100 |
| 6th access | 111 | 101 |
| 7th access | 101 | 110 |
| 8th access | 100 | 111 |

As illustrated in Table 1, these eight sequential accesses using address bits having a natural binary code format involves eight toggles on a bit position 0 (e.g., the least significant bit (LSB)) (e.g., to program a bit position 0 to "0" for $1^{st}$ access and switching from "0" to "1" or "1" to "0" over 7 subsequent accesses), four toggles on a bit position 1 (e.g., to program a bit position 1 to "0" for $1^{st}$ access and switching from "0" to "1" between $2^{nd}$ and $3^{rd}$ accesses and $6^{th}$ and $7^{th}$ accesses), and two toggles on a bit position 2 (e.g., the most significant bit (MSB)) (e.g., to program a bit position 2 to "0" for $1^{st}$ access and switching from "0" to "1" between $4^{th}$ and $5^{th}$ accesses). Alternatively, the same eight sequential accesses but using address bits having an RBC format total eight toggles since switching between any two accesses involves only a single toggle. Therefore, power consumption associated with address toggling using an RBC format can be reduced by 6/14 as compared to that using a natural binary code format. Accordingly, these (e.g., at least) 8 sets of address bits having a natural binary code format can be input to the address encoders (e.g., address encoders 216, 219, 316 illustrated in FIGS. 2-3) can be converted to those 8 sets of address bits having a reduced Hamming distance binary code format, such as an RBC format for the sequential accesses to addresses of the target component 206.

In some embodiments, an address encoder (e.g., address encoder 216-1, 216-2, 216-3, or 219) can convert a format of only a portion of address bits of each access request to reduce power consumption (by converting those bits not often used for accessing addresses) associated with the conversion, avoid an access to a non-existing address. In one example, in which an access request includes 16 bits of address bits, the address encoder can convert a format of 8 bits sequentially located starting from a bit position corresponding to LSB, while a format of the other address bits (8 bits sequentially located starting from a bit position corresponding to MSB and that are typically less toggled than the other 8 bits) is not converted and can remain as a binary code format.

In another example, consider an access request including 32 bits of host (e.g., CPU) address bits with few bits (e.g., address bits [1:0] among 32 bits) of those bits dedicated for "byte-level addressing". For example, one bit (e.g., Bit 0) of these address bits (e.g., address bits [1:0]) dedicated for "byte-level addressing" can be used to indicate whether an even or odd addresses (e.g., word) within the bytes should be accessed. More specifically, if Bit 0 is 0, it indicates an odd byte address (e.g., accessing the first or third byte in a 32-bit word), while if Bit 0 is 1, it indicates an even byte address (e.g., accessing the second or fourth byte in a 32-bit word). Further, another bit (e.g., Bit 1) of these address bits (e.g., address bits [1:0]) dedicated for "byte-level addressing" can be used to select one of two even or odd address within a 32-bit word. More specifically, if Bit 1 is 0, it indicates a first byte address among those two odd or even bytes (e.g., the first or third byte in a 32-bit word), while if Bit 1 is 1, it indicates a second byte address among those two odd or even bytes (e.g., the second or fourth byte in a 32-bit word), although embodiments are not so limited. In this example, the format of those bits (e.g., address bits [1:0]) dedicated for "byte-level addressing" may not be converted to a reduced Hamming distance code and can remain as a binary code format. Meanwhile, a format of at least a portion of remaining address bits can be converted to a reduced Hamming distance code format at a respective address encoder (e.g., address encoder 216-1, 216-2, 216-3, or 219).

In a different example, an access request can be directed to (e.g., to access) different targets (e.g., target components 106 illustrated in FIG. 1) with its address bits interleaved among different targets. In this example, each set of address bits (among multiple sets of address bits respectively directed to different targets) can be selectively encoded and/or decoded depending on compatibility and/or characteristics of respective targets. For example, if multiple targets that are to be accessed by sets of address bits of a single access request are all compatible with access via address bits having a reduced Hamming distance binary code format, all of the sets of address bits can be encoded to be of a reduced Hamming distance binary code format. On the other hand, those sets of address bits (among the sets of address bits of the access request) are directed to targets that are not compatible with access via address bits having a reduced Hamming distance binary code format, those sets may not be selectively encoded.

In a further different example, consider a target address space having 1536 units. While 11 address bits may be used to access the target address space, encoding all of 11 bits (to convert its format to a reduced Hamming distance binary code format) to can result in the encoded 11 bits to indicate a value that exceeds the limit of 1536 units. To address this limitation and in one embodiment, 9 bits out of 11 bits can be encoded while leaving 2 bits (e.g., upper 2 bits) as is. Alternatively, depending on the value of the 11th bit, a dynamic encoding mechanism can be employed, allowing for either 10-bit encoding when the value is within the range of 0-1023, or 9-bit encoding when the value falls within the range of 1024-1535.

Access requests encoded at the address encoders 216-1 and 216-2 are further transferred to the selection component 214-3, which selectively transfers the received access requests (e.g., one at a time) further to the selection component 214-4. The selection component 214-4 further receives an encoded access request from the address encoder 216-3 and directly from the initiator 202-4 and selectively transfer the received access requests to the target component 206. The access requests received at the target component 206 can have a reduced Hamming distance code format (as a result of encoding processes performed at respective address encoders 216) and the target component 206 can be accessed as a result of the access requests being executed (e.g., at and/or by the target component 206).

Figure 3:
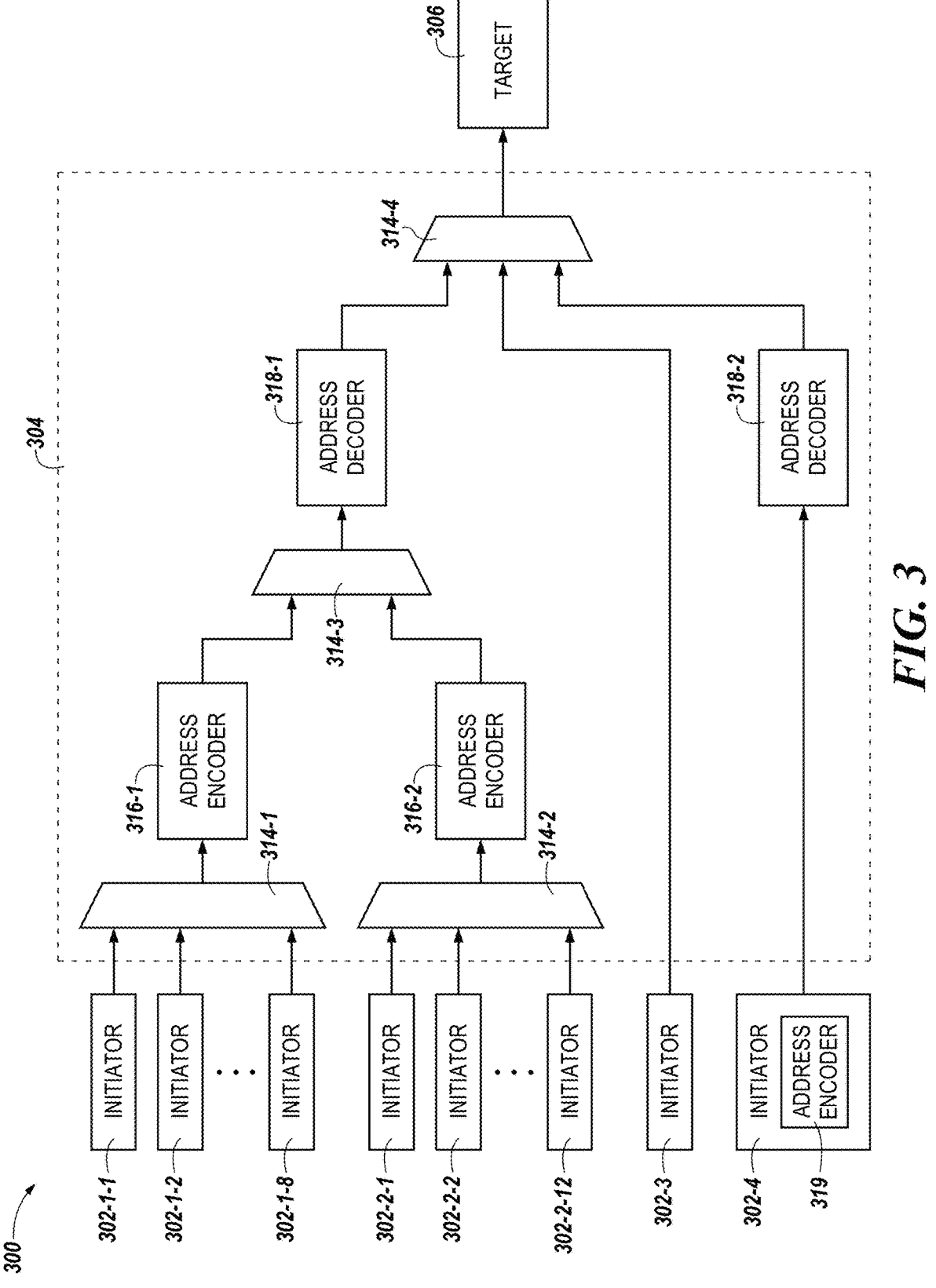
FIG. 3 illustrates another example portion of a computing system configured to perform reduced power addressing in accordance with various embodiments of the present disclosure.

Although it is illustrated in FIG. 2 that access requests are encoded once at respective address encoders 216-1, 216-2, 216-3, and 219, embodiments are not so limited such that access requests can be encoded and/or decoded (e.g., at respective address decoders, such as address decoders 318 illustrated in FIG. 3) more than once. Alternatively speaking, conversion of a format of bits (e.g., including, but not limited to, at least a portion of address bits) of access requests can occur multiple times among different code formats (e.g., binary code format, reduced Hamming distance code format, etc.).

Embodiments are not limited to a particular quantity/type of target components to which access requests from one initiator can be directed to. For example, although it is illustrated in FIG. 2 that access requests originating from initiators 202 are ultimately transferred to and/or to access the target component 206, the access requests can be further transferred to (upon requests by the initiator 202) different target components (e.g., the target component 306 illustrated in FIG. 3) that may or may not be compatible with access via address bits having the reduced Hamming distance code format.

FIG. 3 illustrates another example computing system 300 illustrating further details of the intermediate component 304 in accordance with some embodiments of the present disclosure. As illustrated in FIG. 3, the computing system 300 includes initiator components 302-1-1, . . . , 302-1-8 (collectively referred to as initiators 302-1), 302-2-1, . . . , 302-2-12 (collectively referred to as initiators 302-2), 302-3, and 302-4 ("initiator" shown in FIG. 3), selection components 314-1, . . . , 314-4, address encoders 316-1, . . . , 316-3, address decoders 318-1 and 318-2, and a target component 306. However, embodiments are not so limited to a particular quantity of each component and/or circuits (e.g., selection components, address encoders, address decoders, etc.) of the intermediate component 304 the computing system can include. Initiators 302, intermediate component 304, and target component 306 are analogous to initiators 102, intermediate component 104, and target component 106 illustrated in FIG. 1.

FIG. 3 is generally analogous to FIG. 2. However, unlike the target component 206 illustrated in FIG. 2, the target component 306 may not be compatible with access via address bits having a reduced Hamming distance code format (e.g., RBC format). Accordingly, access requests to be executed to access the target component 306 are desired to be in a binary code format. For example, consider a target component with multiple registers that are to be accessed. Since the registers have distinctive predefined purposes and structures, accessing a wrong register or modifying the wrong field within the register can lead to incorrect program behavior, system crashes, etc. as opposed to the address space, in which the exact memory location may not be critical as long as it's a valid location. Therefore, accessing registers requires precision and sequential access of the registers may not typically be desired to be accessed sequentially, which makes access requests to be less desired to be in a reduced Hamming distance code format.

Therefore, the intermediate component 304 can provide various circuits and/or bypass mechanisms to ensure that address bits received at the target component 306 are in a right format. For example, those access requests generated at 302-1 and 302-2 and encoded respectively at the address encoders 316-1 and 316-2 can be decoded at the address decoder 318 prior to being transferred to the selection component 314-4. Accordingly, address bits of the access requests decoded at the address decoder 318 and received at the target component 306 can be in a binary code format (as opposed to a reduced Hamming distance code format) and executed as a binary code format at the target component 306. Further, for example, access requests generated at the initiator component 302-3 can be directly transferred to the selection component 314-4 without being encoded and/or decoded (so that the binary code format can remain as originally generated at the initiator component 302-3).

Further, the initiator 302-4 includes an address encoder 319 that provides substantially the same functionality (e.g., converting a format of at least a portion of address bits of access requests to a reduced Hamming distance code format) as the address encoder 316. Therefore, the initiator 202-4 is directly coupled to the address decoder 318-2 without being coupled to a separate address encoder of the intermediate component 304. Similar to access requests decoded at the address decoder 318-1, those access requests generated at 302-4 and encoded at the address encoder 319 can be decoded at the address decoder 319 prior to being transferred to the selection component 314-4. Accordingly, address bits of the access requests generated at the initiator 302-4 and decoded at the address decoder can be in a binary code format (as opposed to a reduced Hamming distance code format) and executed as a binary code format at the target component 306.

Embodiments are not limited to a particular quantity/type of target components to which access requests from one initiator can be directed to. For example, although it is illustrated in FIG. 3 that access requests originating from initiators 302 are ultimately transferred to and/or to access the target component 306 that is not compatible with access via address bits having the reduced Hamming distance code format, the access requests can be further transferred to (upon requests by the initiator 302) different target components (e.g., the target component 206 illustrated in FIG. 2) that may or may not be compatible with access via address bits having the reduced Hamming distance code format.

Although it is illustrated in FIG. 3 that access requests are encoded and decoded once at respective address encoders 316-1, 316-2, and 316-3 or address decoder 318-1, 318-2, embodiments are not so limited such that access requests can be encoded and/or decoded more than once. Alternatively speaking, conversion of a format of bits (e.g., including, but not limited to, at least a portion of address bits) of access requests can occur multiple times among different code formats (e.g., binary code format, reduced Hamming distance code format, etc.).

FIG. 4 is a flow diagram corresponding to a method 440 for transfer of address bits in different formats in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the intermediate component 104, 204, 304 of FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, a number of address bits of a first access request or a second access request are selectively transferred from a selection component (e.g., selection component 214, 314 illustrated in FIGS. 2-3) to a first address encoder (e.g., address encoder 116, 216, 219 316 illustrated in FIGS. 1-3). The first and second access requests received at the first selection component are respectively to access a first target component (e.g., target component 106, 206, 306 illustrated in FIGS. 1-3).

At operation 444, a format of the number of address bits can be converted (at the first address encoder) from a first format (e.g., a binary code format that is not tailored to a reduced Hamming distance) to a second format. The second format can correspond to a reduced Hamming distance binary code format that involves a reduced number of toggles in accessing the first target component 106, 206, 306 than using the first format. In some embodiments, a first portion of the number of address bits from the first format can be converted to the second format, while a second portion of the number of address bits is not converted to the second format (and remains in a first format).

At operation 446, (e.g., addresses of) the first target component 106, 206, 306 can be accessed using the number of address bits having the second format. For example, a first address of the target component 106, 206, 306 can be accessed using a first set of address bits having the second format. A second address of the target component 106, 206, 306 can be sequentially accessed using a set of address bits having the second format by toggling an address signal associated with the first target component 106, 206, 306 to indicate a flipped bit between the first and second sets of address bits.

In some embodiments, a third access request with address bits having the first format can be received (at the first selection component) to access a second target component 106, 306. The second target component 106, 306 may not be compatible with access via address bits having the second format. In this example, the third access request with the address bits having the first format can be transferred to the second target component 106, 306 as is such that the third access request can be executed with the address bits in a first format.

In some embodiments, a third access request with address bits having the first format can be received (at the first selection component) to access a second target component 106, 306. The second target component 106, 306 may not be compatible with access via address bits having the second format. In this example, the format of the address bits of the third access request that have been converted (e.g., at a second address encoder) to the second format can be converted back (at a first address decoder) to the first format prior to transferring the third access request to the second target component 106, 306. As such, the third access request can be transferred to the second target component 106, 306 with the address bits having the first format such that the third access request can be executed with the address bits in a first format.

In some embodiments, the first target component 106, 206, 306 can be further coupled to a second selection component (e.g., selection component 214-3, 214-4, 314-3, 314-4 illustrated in FIGS. 2-3). In this example, the method 440 further comprises receiving, at the second selection component 214-3, 214-4, 314-3, 314-4, a plurality of access requests that are encoded at different address encoders 216, 219, 316 and selectively transferring, at the second selection component 214-3, 214-4, 314-3, 314-4, a number of address bits of a respective one of the plurality of access requests to the first target component 106, 206, 306.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

selectively transferring, from a first selection component and responsive to receiving a first access request and a second access request respectively to access a first target component, a number of address bits of the first access request or the second access request to a first address encoder;

converting, at the first address encoder, a format of the number of address bits from a first format to a second format, wherein the second format corresponds to a reduced Hamming distance binary code format that involves a reduced number of toggles in accessing the first target component than using the first format;

accessing the first target component using the number of address bits having the second format;

receiving a third access request with address bits having the first format to access a second target component, wherein the second target component is not compatible with access via address bits having the second format; and transferring, to the second target component, the third access request with the address bits having the first format as is to cause the third access request to be executed at the target component with the address bits in the first format.

2. The method of claim 1, wherein accessing the first target component using the number of address bits having the second format further comprises:

accessing a first address of the target component using a first set of address bits having the second format; and sequentially accessing a second address of the target component using a set of address bits having the second format by toggling an address signal associated with the first target component to indicate a flipped bit between the first and second sets of address bits.

3. The method of claim 1, wherein converting the format of the number of address bits at the first address encoder further comprises:

converting a first portion of the number of address bits from the first format to the second format, while a second portion of the number of address bits is not converted to the second format.

4. The method of claim 1, further comprising:

receiving a third access request with address bits having the first format to access a second target component, wherein the second target component is not compatible with access via address bits having the second format;

converting, at a second address encoder, a format of the address bits of the third access request from the first format to the second format;

converting, at a first address decoder, the format of the address bits of the third access request from the second format back to the first format prior to transferring the third access request to the second target component; and transferring, to the second target component, the third access request with the address bits having the first format to cause the third access request to be executed at the target component with the address bits in the first format.

5. The method of claim 1, wherein the first target component is further coupled to a second selection component, wherein the method further comprises:

receiving, at the second selection component, a plurality of access requests that are encoded at different address encoders; and selectively transferring, at the second selection component, a number of address bits of a respective one of the plurality of access requests to the first target component.

6. An apparatus, comprising:

a first address encoder;

a first selection component coupled to the first address encoder, the first selection component configured to selectively transfer a first access request or a second access request to the first address encoder in response to receipt of the first and second access requests respectively to access a target component;

the first address encoder configured to convert, to encode a first number of address bits of the first access request or the second access request, the first number of address bits having a first format to a second format, wherein the second format corresponds to a reduced Hamming distance binary code format that involves a reduced number of toggles in accessing the target component than using the first format; and a second selection component configured to:

receive a plurality of access requests including the first access request or the second access request with the first number of address bits having the converted format; and selectively transfer one of the plurality of access requests to the target component to access the target component via execution of the one of the plurality of access requests; and wherein the second selection component is further configured to convert, to decode a third number of address bits of a respective access request of the plurality of access requests, the third number of address bits from the second format back to the first format.

7. The apparatus of claim 6, wherein the first address encoder is configured to convert a first portion of the first number of address bits from the first format to the second format, while a second portion of the first number of address bits is not converted to the second format.

8. The apparatus of claim 6, further comprising a second address encoder configured to:

receive a third access request to access the target component;

convert, to encode a second number of address bits of the third access request, the second number of address bits having the first format to the second format; and transfer the third access request having the converted format to the second selection component.

9. The apparatus of claim 6, wherein at least two access requests of the plurality of access requests are received at the second selection component from different address encoders.

10. The apparatus of claim 6, wherein address bits of at least two access requests of the plurality of access requests received at the second selection component have different formats.

11. The apparatus of claim 6, wherein the first number of address bits comprises a plurality of sets of address bits respectively corresponding to a plurality of addresses of the target component that are to be sequentially accessed via the first number of address bits.

12. The apparatus of claim 11, wherein respective binary values of two sets of address bits of the first number of address bits differ in a single bit position.

13. The apparatus of claim 6, wherein the reduced Hamming distance binary code format is a reflected binary code (RBC) format, a Johnson ring binary code format, or a unit-distance code format, or any combination thereof.

14. A system, comprising:
a plurality of initiator components configured to issue respective access requests to access at least one of a plurality of target components;
an intermediate component coupled to the plurality of initiator components and the plurality of target components, the intermediate component configured to:
in response to receipt of a first access request to access the first target component from a first initiator component of the plurality of target components, wherein the first target component is compatible with access via address bits having a first format corresponding to a reduced Hamming distance binary code format:
convert a first number of address bits of the first access request and having a second format to the first format; and
transfer the first number of address bits having the converted format to the first target component to cause the first target component to be accessed using the first number of address bits having the converted format; and
in response to receipt of a second access request to access the second target component from a second initiator component of the plurality of target components, wherein the second target component is not compatible with access via address bits having the first format;
convert a second number of address bits of the second access request and having a second format to the first format;
convert the second number of address bits of the second access request and having the first format to the second format prior to the second access request being received at the second target component; and
transfer the second number of address bits having the converted format to the second target component to cause the second target component to be accessed using the second number of address bits having the second format.

15. The system of claim 14, wherein the intermediate component further comprises an address decoder directly coupled to at least one of the plurality of initiator components or the plurality of target components, the address decoder configured to convert a third number of address bits of a third access request generated at the one of the plurality of initiator components to the first format.

16. The system of claim 14, wherein the intermediate component is configured to:
receive a third access request to access the second target component and including a number of address bits having the second format; and
transfer the third access request having the second format to the second target component as is to cause the second target component to be accessed using the third access request having the second format.

17. The system of claim 14, wherein the intermediate component is configured to:
receive a third access request to access the first target component and including a third number of address bits having the second format; and
convert, at different address encoders of the intermediate component, respective formats of the first number of address bits and the third number of address bits to the first format.

18. The system of claim 14, wherein:
the system is a System-on-Chip (SoC); and
the plurality of target components comprises one or more initiator ports, loopback ports, input/output (I/O) ports of an initiator connector, or any combination thereof.

19. A method, comprising:
selectively transferring, from a first selection component and responsive to receiving a first access request and a second access request respectively to access a first target component, a number of address bits of the first access request or the second access request to a first address encoder;
converting, at the first address encoder, a format of the number of address bits from a first format to a second format, wherein the second format corresponds to a reduced Hamming distance binary code format that involves a reduced number of toggles in accessing the first target component than using the first format; and
accessing the first target component using the number of address bits having the second format, wherein the method further comprises:
receiving a third access request with address bits having the first format to access a second target component, wherein the second target component is not compatible with access via address bits having the second format;
converting, at a second address encoder, a format of the address bits of the third access request from the first format to the second format;
converting, at a first address decoder, the format of the address bits of the third access request from the second format back to the first format prior to transferring the third access request to the second target component; and
transferring, to the second target component, the third access request with the address bits having the first format to cause the third access request to be executed at the target component with the address bits in the first format.

20. An apparatus, comprising:
a first address encoder;
a first selection component coupled to the first address encoder, the first selection component configured to selectively transfer a first access request or a second access request to the first address encoder in response to receipt of the first and second access requests respectively to access a target component;
the first address encoder configured to convert, to encode a first number of address bits of the first access request or the second access request, convert a first portion of the first number of address bits from the first format to the second format, while a second portion of the first number of address bits is not converted to the second format, wherein the second format corresponds to a reduced Hamming distance binary code format that involves a reduced number of toggles in accessing the target component than using the first format; and a second selection component configured to:

receive a plurality of access requests including the first access request or the second access request with the first number of address bits having the converted format; and selectively transfer one of the plurality of access requests to the target component to access the target component via execution of the one of the plurality of access requests.

21. An apparatus, comprising:

a first address encoder;

a second address encoder;

a first selection component coupled to the first address encoder, the first selection component configured to selectively transfer a first access request or a second access request to the first address encoder in response to receipt of the first and second access requests respectively to access a target component;

the first address encoder configured to convert, to encode a first number of address bits of the first access request or the second access request, the first number of address bits having a first format to a second format, wherein the second format corresponds to a reduced Hamming distance binary code format that involves a reduced number of toggles in accessing the target component than using the first format;

the second address encoder configured to:

receive a third access request to access the target component;

convert, to encode a second number of address bits of the third access request, the second number of address bits having the first format to the second format; and transfer the third access request having the converted format to the second selection component; and a second selection component configured to:

receive a plurality of access requests including the first access request or the second access request with the first number of address bits having the converted format; and selectively transfer one of the plurality of access requests to the target component to access the target component via execution of the one of the plurality of access requests.

22. An apparatus, comprising:

a first address encoder;

a first selection component coupled to the first address encoder, the first selection component configured to selectively transfer a first access request or a second access request to the first address encoder in response to receipt of the first and second access requests respectively to access a target component;

the first address encoder configured to convert, to encode a first number of address bits of the first access request or the second access request, the first number of address bits having a first format to a second format, wherein the second format corresponds to a reduced Hamming distance binary code format that involves a reduced number of toggles in accessing the target component than using the first format; and a second selection component configured to:

receive a plurality of access requests including the first access request or the second access request with the first number of address bits having the converted format, wherein at least two access requests of the plurality of access requests received at the second selection component have different formats or are received from different address encoders; and selectively transfer one of the plurality of access requests to the target component to access the target component via execution of the one of the plurality of access requests.

* * * * *